(12) United States Patent
Huang et al.

(10) Patent No.: US 11,546,831 B1
(45) Date of Patent: Jan. 3, 2023

(54) CLOSING OPEN LOOPS OF WIRELESS MESH NETWORKS

(71) Applicant: Meta Platforms, Inc., Menlo Park, CA (US)

(72) Inventors: Po Han Huang, Cypress, TX (US); Pratheep Bondalapati, Woodland Hills, CA (US); Krishna Srikanth Gomadam, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/348,822

(22) Filed: Jun. 16, 2021

(51) Int. Cl.
  *H04W 40/24* (2009.01)
  *H04L 45/18* (2022.01)
  *H04W 84/18* (2009.01)

(52) U.S. Cl.
  CPC .......... *H04W 40/248* (2013.01); *H04L 45/18* (2013.01); *H04W 84/18* (2013.01)

(58) Field of Classification Search
  None
  See application file for complete search history.

(56) References Cited

U.S. PATENT DOCUMENTS

| | | | |
|---|---|---|---|
| 7,283,478 B2 | 10/2007 | Barsheshet et al. | |
| 9,826,414 B2 | 11/2017 | Liu et al. | |
| 9,847,478 B2 | 12/2017 | Ashwood-Smith | |
| 10,542,330 B2 | 1/2020 | Hopcraft et al. | |
| 11,178,662 B2 * | 11/2021 | Chen | H04W 40/00 |
| 2008/0250124 A1 | 10/2008 | Rentschler | |
| 2009/0175238 A1 * | 7/2009 | Jetcheva | H04W 28/085 370/329 |
| 2013/0223275 A1 * | 8/2013 | Vasseur | H04L 45/26 370/254 |
| 2018/0302807 A1 * | 10/2018 | Chen | H04W 28/0268 |

OTHER PUBLICATIONS

HSR—Industrial Ethernet Ring Networks with Seamless Redundancy; https://www.youtube.com/watch?v=ExyR9VLxQH8&ab_channel=Siemens; Oct. 25, 2012.
Redundant Ring—5 Effective Ways to Extend your Data Communication Distance; https://www.youtube.com/watch?v=A-x7PFatyJo&ab_channel=CommfrontComm; Mar. 23, 2018.

* cited by examiner

*Primary Examiner* — Brian S Roberts
(74) *Attorney, Agent, or Firm* — BakerHostetler

(57) ABSTRACT

Apparatuses, methods, and systems for closing open loops of a wireless mesh network are disclosed. One method includes determining a representation of a wireless mesh network including nodes, and wireless links between the nodes, identifying end-site nodes of the wireless mesh network, determining open loops of the wireless mesh network that include the identified end-site nodes, generating a list of potential nodes for closing each of the open loops with the identified end-site node, testing one or more of the potential nodes, comprising testing performance of a wireless connection between each end-site node and the one or more potential nodes, wherein the performance includes a number of wireless hops around each closed loop formed including the end-site node and each potential node, selecting a closing node based on the testing, and providing a wireless link connection between one or more of the end-site nodes and the closing node.

20 Claims, 8 Drawing Sheets

CLOSING OPEN LOOPS OF WIRELESS MESH NETWORKS

FIELD OF THE DESCRIBED EMBODIMENTS

The described embodiments relate generally to wireless communications. More particularly, the described embodiments relate to systems, methods, and apparatuses for closing open loops of wireless mesh network.

BACKGROUND

Planning of wireless network is a critical phase that occurs prior to deployment, especially for wireless backhaul networks. A key requirement of the network planning includes high redundancy or network availability of the backhaul network. A typical network planning results in a network that includes end sites that need to be manually closed to improve redundancy. This requires manual intervention and thereby slows down the network design process.

It is desirable to have methods, apparatuses, and systems for closing open loops of wireless mesh networks.

SUMMARY

An embodiment includes a method of closing open loops of a wireless mesh network. The method includes determining a representation of a wireless mesh network including nodes, and wireless links between the nodes, identifying end-site nodes of the wireless mesh network, wherein end-site nodes have only a single wireless link to the wireless mesh network, determining open loops of the wireless mesh network that include the identified end-site nodes, generating a list of potential nodes for closing each of the open loops with the identified end-site node, testing one or more of the potential nodes, comprising testing performance of a wireless connection between each end-site node and the one or more potential nodes, wherein the performance includes a number of wireless hops around each closed loop formed including the end-site node and each potential node, selecting a closing node based on the testing, and providing a wireless link connection between one or more of the end-site nodes and the closing node.

Another embodiment includes a system for closing open loops of a wireless mesh network. The system includes a plurality of wireless nodes, wherein wireless links between the plurality of nodes form a wireless mesh network, and a network server. The network server operates to determine a representation of the wireless mesh network including nodes, and wireless links between the nodes, identify end-site nodes of the wireless mesh network, wherein end-site nodes have only a single wireless link to the wireless mesh network, determine open loops of the wireless mesh network that include the identified end-site nodes, generate a list of potential nodes for closing each of the open loops with the identified end-site node, test one or more of the potential nodes, comprising testing performance of a wireless connection between each end-site node and the one or more potential nodes, wherein the performance includes a number of wireless hops around each closed loop formed including the end-site node and each potential node, select a closing node based on the testing, and provide a wireless link connection between one or more of the end-site nodes and the closing node.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for closing open loops of wireless mesh networks. Open loops are identified by end-site nodes, wherein an end-site node resides at both ends of the open loop. End-site nodes are identified as having only a single wireless link to one other node of the wireless mesh network. To increase the robustness, it is desirable to wirelessly connect both ends of the open loop by adding one additional link to "close" the loop so that each node in the loop has at least two paths (wireless links) to the other nodes. For an embodiment, it may be determined that it is more beneficial to add a wireless link to an end-site node that is between the end-site node and a non-end-site node.

Figure 1:
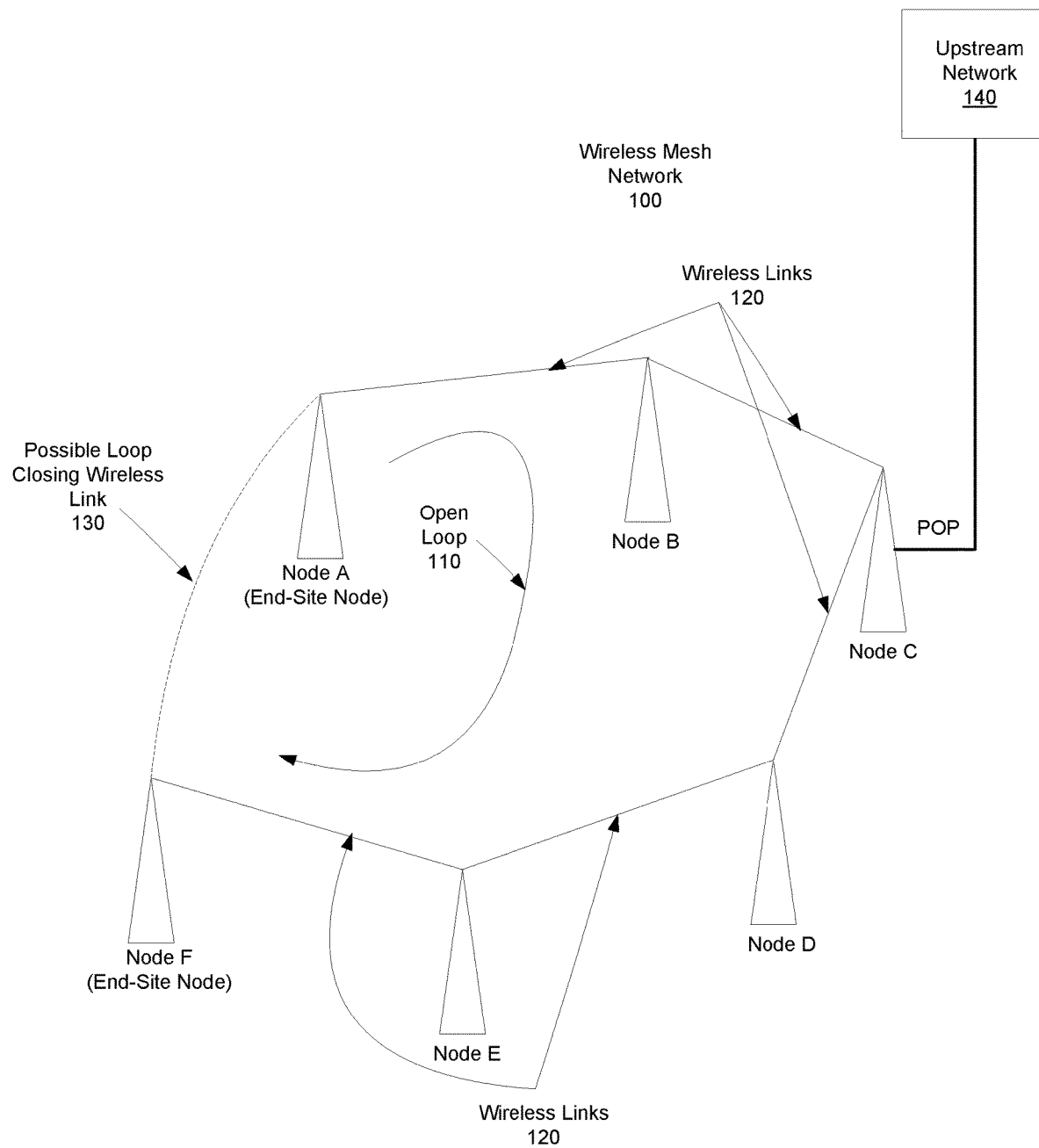
FIG. 1 shows a portion of a wireless mesh network that includes end-site nodes, according to an embodiment.

FIG. 1 shows a portion of a wireless mesh network 100 that includes end-site nodes, according to an embodiment. The wireless mesh network includes nodes (Node A-Node F) in which wireless links 120 connect the nodes forming the wireless mesh network 100. When operating, a client device (user) can wirelessly connect to one of the nodes of the wireless mesh network to obtain network access to an upstream network (such as, the internet) through, for example, a point of presence (POP). Accordingly, the wireless mesh network may be operating as a backhaul network.

An important feature of a wireless mesh network is redundancy. That is, if a node or a wireless link of the wireless mesh network should fail, it is desirable to have a backup or secondary upstream path available to allow a node to maintain connection to the upstream network. Generally, upstream data is data that flows towards the upstream network, and downstream data is data that flows away from the upstream network.

The portion of the wireless mesh network 100 includes two end-site nodes (Node A, Node F). End-site nodes are nodes that only include a single wireless link to another node of the wireless mesh node. The end-site nodes are more susceptible to failure because the end-site node only has a single wireless link to the wireless mesh network. The failure may be due to the failure of an upstream link or an upstream node. Without a backup wireless link to another node of the wireless mesh network, the end-site node may lose connection to the wireless mesh network.

Redundancy of the portion of the wireless mesh network 100 can be improved by eliminating or reducing the number of end-site nodes. One method of doing this is to identify open loops and then close the open loops with the addition of a wireless link between end-site nodes of the open loops. An open loop can be identified as a path of nodes in which the end nodes of the path of the open loop are end-site nodes. FIG. 1 shows an open loop 110 between the end-site nodes Node A and Node B. The open loop 110 can be closed with the introduction of a new wireless link 130 between the end-site nodes. The introduction of the new wireless link 130 provides a redundant path from each node to each of the other nodes of the portion of the wireless mesh network. Therefore, the wireless mesh network is more reliable when failure of a link or node of the wireless mesh network occurs.

Figure 2:
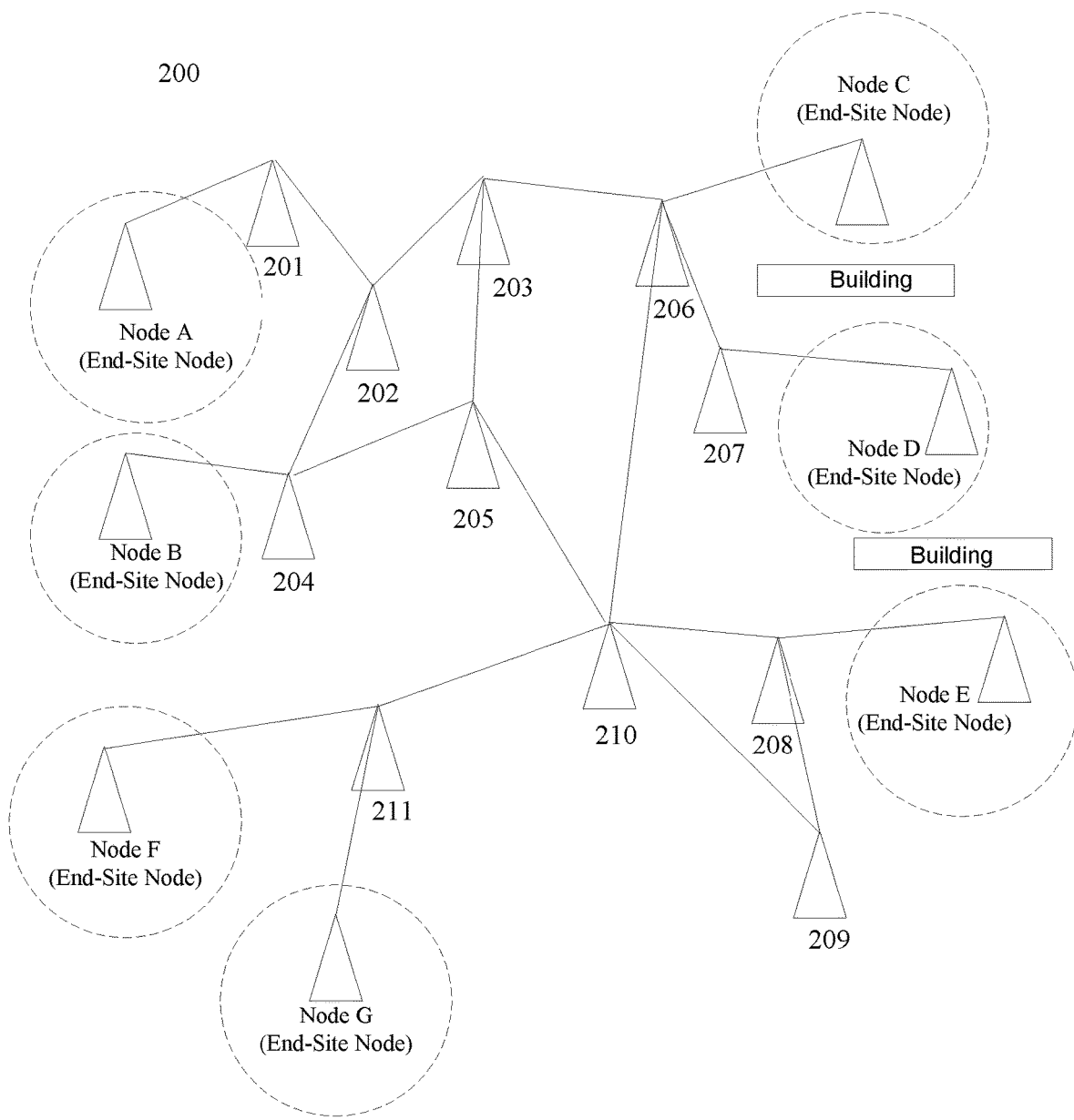
FIG. 2 shows a wireless mesh network that includes several end-site nodes, according to an embodiment.

FIG. 2 shows a wireless mesh network 200 that includes several end-site nodes, according to an embodiment. The representation of the wireless mesh network can be generated as a plan for a future network, or the representation of the wireless mesh network can be generated from an existing deployed wireless mesh network. The wireless mesh network of either representation can benefit from the closing of open loops and the reduction in end-site nodes.

Again, end-site nodes can be identified as nodes that only have a single wireless link connecting them to other nodes of the wireless mesh network. The wireless mesh network of FIG. 2 includes end-site nodes Node A-Node F, and non-end-site nodes 201-211. Generally, one of the non-end-site nodes 201-211 is wire connected to an upstream network through, for example, a POP. Once the end-site nodes having been identified, performance (redundancy) of the wireless connections can be improved by closing open loops formed by the end-site nodes.

Figure 3:
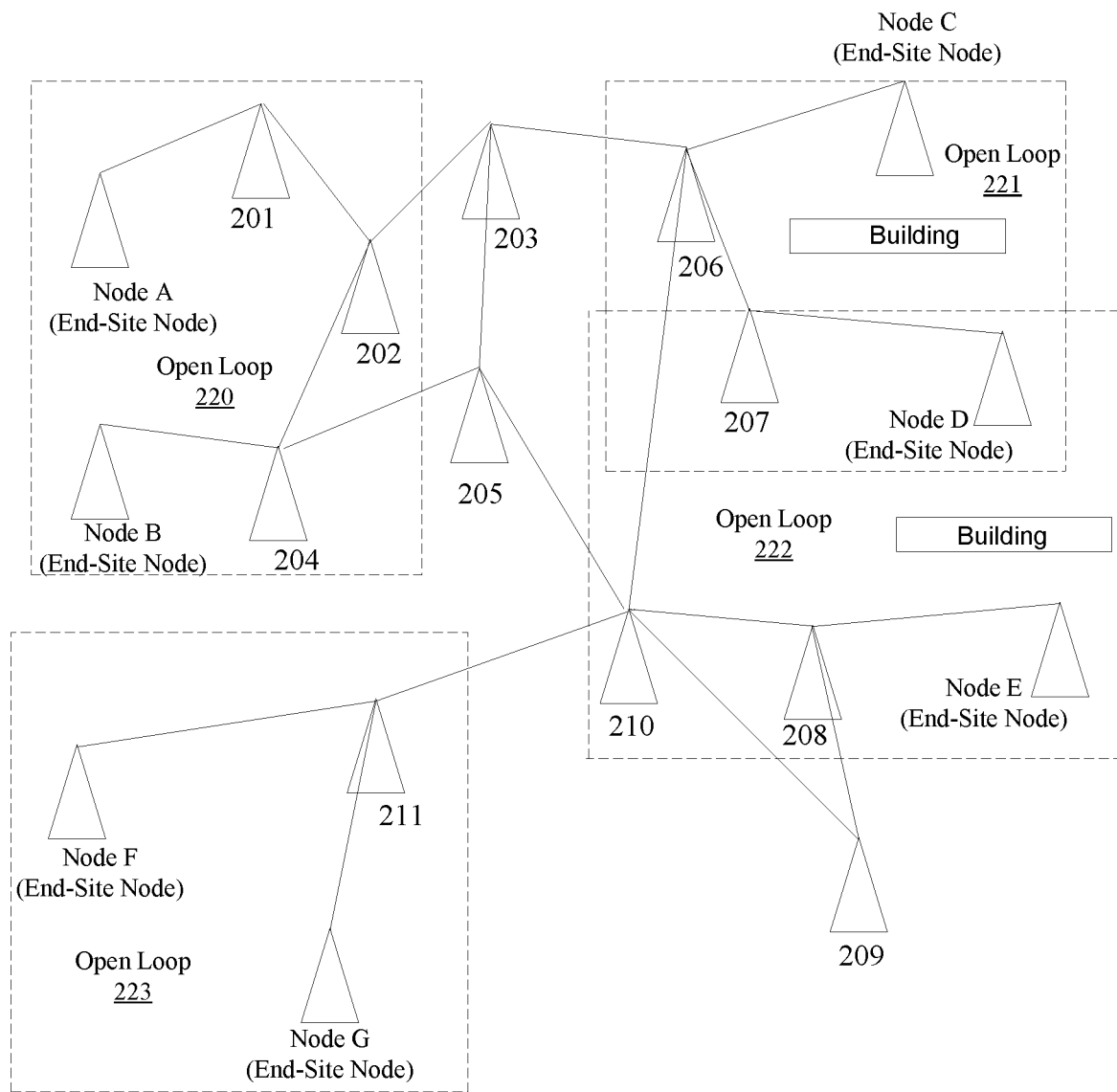
FIG. 3 shows a wireless mesh network that includes several end-site nodes wherein open loops that include the end-site nodes are identified, according to an embodiment.

FIG. 3 shows a wireless mesh network that includes several end-site nodes wherein open loops that include the end-site nodes are identified, according to an embodiment. Once the end-site nodes of the wireless mesh network have been identified, open loops of the wireless mesh network are determined. FIG. 3 shows open loops 220, 221, 222, 223. As previously described, open loops are identified by having end-site nodes as endpoints or end nodes. Different open loop selections can be made. However, for an embodiment, the open loops that include the fewest number of nodes within them are selected. For example, and an open loop could have been selected between the nodes Node B and Node F. However, that loop includes 6 nodes. In contrast, the open loops 220 and 223 include only 4 nodes and 2 nodes. In addition to the number of wireless hops (wireless links) within the open loops, for an embodiment, open loop identification between end-site nodes can be further based on the physical locations of the end-site nodes that are selected as the end nodes of the open loop. For example, physical closeness between the end-site nodes can reflect a quality of the potential closing link. Further, the open loop selection can be influenced by the quality of the wireless link between the end-site nodes. For an embodiment, only end-site nodes having a direct line-of-sight (LOS) between each other are selected as the end node of the identifies open loops.

For an embodiment, an open loop is only selected if the number of nodes within the open loop is less than a selected threshold. Otherwise, other means for providing wireless link redundancy is utilized. Further, as previously stated, an open loop is only selected if the end-site nodes of the open loop have a direct line-of-sight (LOS) with each other.

Figure 4:
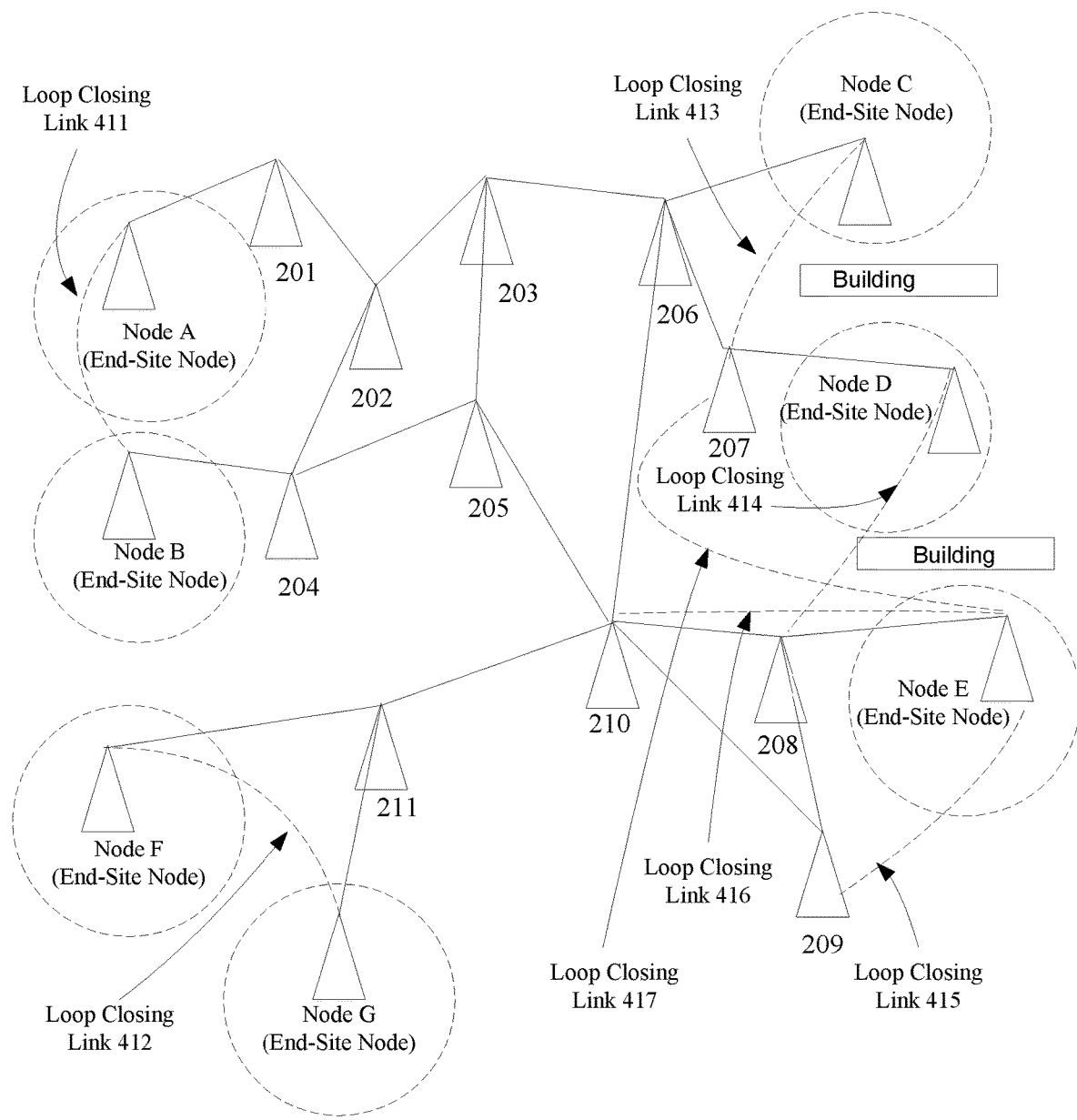
FIG. 4 shows a wireless mesh network that includes several end-site nodes wherein open loops that include the end-site nodes are identified, and possible loop closing links are determined, according to an embodiment.

FIG. 4 shows a wireless mesh network that includes several end-site nodes wherein open loops that include the end-site nodes are identified, and possible loop closing links are determined, according to an embodiment. A possible closing link 411 closes the open loop formed by nodes Node A, Node B. A possible closing link 412 closes the open loop formed by nodes Node F, Node G.

Identifying closing links for the open loops formed by nodes Node C, Node D, and by nodes Node D, Node E are more difficult. These open loops further include wireless link blocking due to features, such as, buildings. The building may make the creation of a link between certain nodes impossible or very difficult (poor wireless link quality). As previously stated, for an embodiment, open loops are only closed by a wireless link that includes a direct LOS wireless connection between the end-site nodes of the open loop.

If the closing of an open loop by wirelessly connecting the end-site nodes of the open loop is not possible, the end-site nodes can be selectively connected to non-end-site nodes. For example, end-site node Node C can be wirelessly connected to non-end-site node 207 if a wireless connection to node Node D is not possible or results in a poor quality (link quality threshold lower than a selected threshold).

When the closing of an open loop requires greater than a selected number of nodes (and wireless hops between the end-site nodes), then an embodiment includes using other considerations or factors for wirelessly connecting at least one of the end-site nodes with a non-end-site node. Further, when the closing of an open loop requires selecting a closing link that causes more harm through increased interference or decreased throughput, then an embodiment includes using other consideration for wirelessly connecting at least one of the end-site nodes with a non-end-site node.

For an embodiment, a weighting process is used for selecting a closing node for providing a redundant (second) wireless link to an end-site node. The weighting process can include selecting the closing node as the other end-site node of the open loop that includes the end-site node when the number of wireless hops (wireless links) of the open loop is less than a threshold number. This is a desirable selection because redundancy is provided to two separate end-site nodes at the same time with the additional of only one wireless link to the wireless mesh network. If the identified open loop includes more than the threshold number of wireless hops, then secondary considerations, such as, wireless link qualities, throughput (between the end-site node and the closing node, or throughput through all intervening nodes to a wire connections node), or interference (that is, interference suffered by other nodes of the wireless mesh network due to the addition of the wireless link between the end-site node and the closing node). Other secondary consideration include the number of existing direct wireless links of the closing node, or an angle of a wireless connection of the closing wireless link relative to an existing active wireless link.

Figure 5:
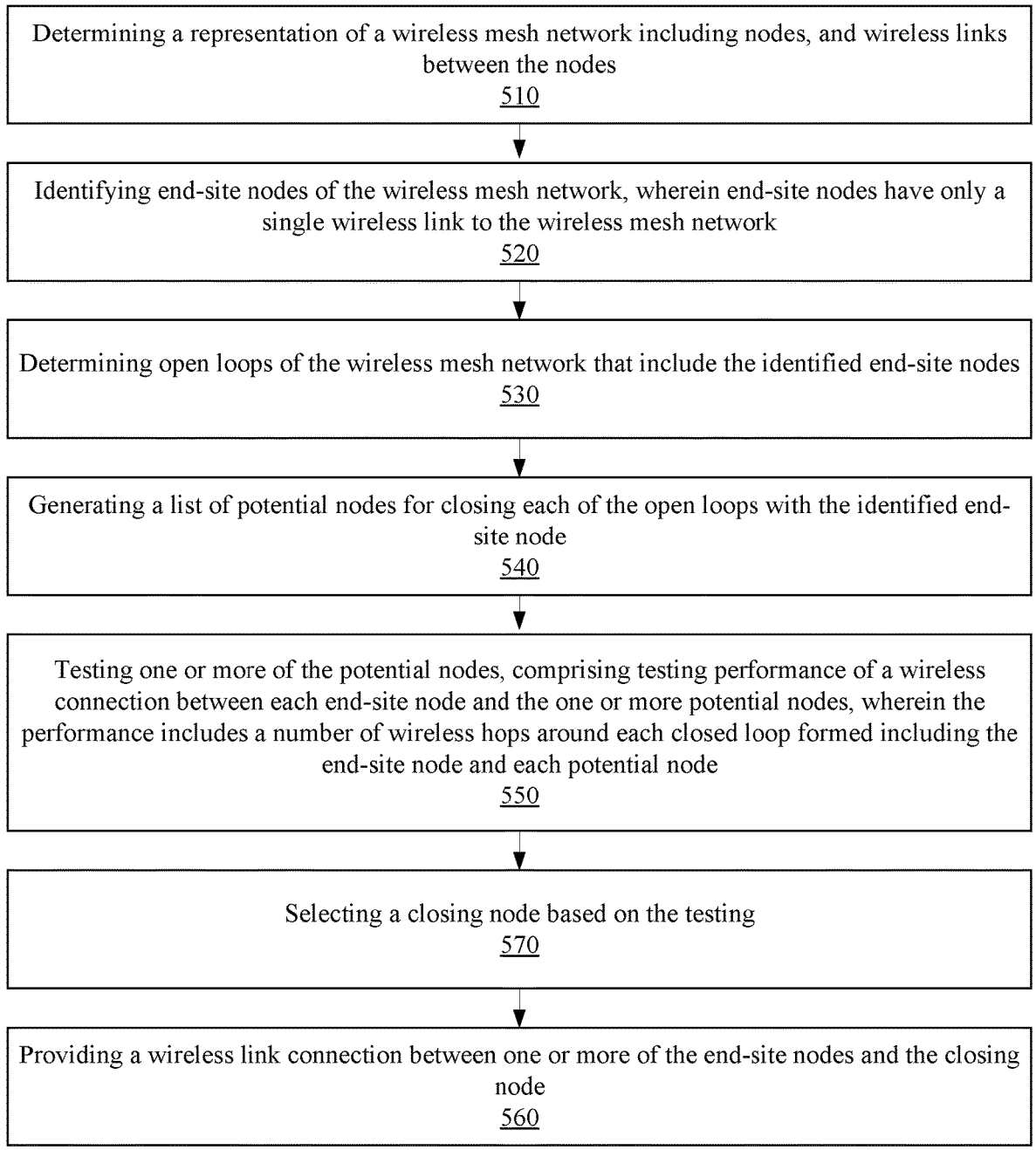
FIG. 5 shows a flow chart that includes steps of a method of closing open loops of a wireless mesh network, according to an embodiment.

FIG. 5 shows a flow chart that includes steps of a method of closing open loops of a wireless mesh network, according to an embodiment. A first step 510 includes determining a representation of a wireless mesh network including nodes, and wireless links between the nodes. A second step 520 includes identifying end-site nodes of the wireless mesh network, wherein end-site nodes have only a single wireless link to the wireless mesh network. A third step 530 includes determining open loops of the wireless mesh network that include the identified end-site nodes. A fourth step 540 includes generating a list of potential nodes for closing each of the open loops with the identified end-site node. A fifth step 550 includes testing one or more of the potential nodes, comprising testing performance of a wireless connection between each end-site node and the one or more potential nodes, wherein the performance includes a number of wireless hops (wireless links) around each closed loop formed including the end-site node and each potential node. A sixth step 560 includes selecting a closing node based on the testing. A seventh step 570 includes providing a wireless link connection between one or more of the end-site nodes and the closing node.

For an embodiment, the wireless mesh network is a planned network. For an embodiment, the wireless mesh network is a deployed network.

For an embodiment, the generated list of potential nodes includes identified end-site nodes and non-end-site nodes. For an embodiment, selecting the closing node based on the testing include preferentially weighting identified end-site nodes as the closing node over non-end-site nodes as the closing node. For an embodiment, a non-end-site node is selected as the closing node when the number of wireless hops around each of the closed loops formed including each of the end-site nodes is greater than a preselected number.

For an embodiment, the testing of the one or more potential nodes further includes determining a link quality of a wireless link between each end-site node and the one or more potential nodes. For an embodiment, the link quality is determined by a resulting signal strength between each end-site node and the one or more potential nodes. For an embodiment, the link quality is determined by a packet error rate or a bit error rate of wireless communication through the wireless link.

For an embodiment, the link quality is determined by a resulting throughput between each end-site node and the one or more potential nodes. For an embodiment, the link quality is determined by a resulting throughput between each end-site node and an upstream POP (point of presence) resulting from a wireless link between the end-site node and each of the one or more potential nodes, wherein the POP includes a wired connection to an upstream network.

For an embodiment, the link quality is determined by a resulting interference with other wireless links of the mesh network caused by the wireless link between each end-site node and the one or more potential nodes.

Figure 8A:
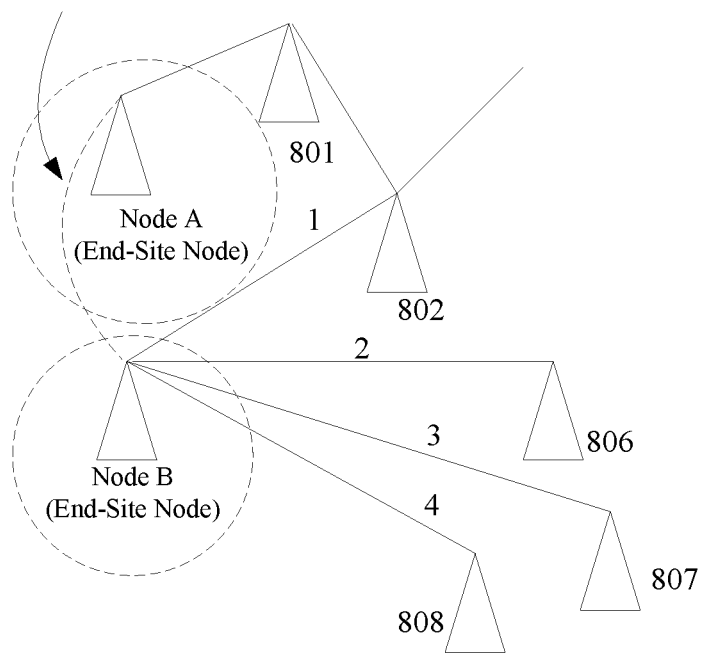
FIGS. 8A and 8B show examples of conditions of a potential connecting node that may negate (restrict) closing an open loop using the potential connecting node, according to embodiments.

For an embodiment, the link quality is determined by a number or existing active links between neighboring nodes of the one or more potential nodes. That is, as shown in FIG. 8A, when a potential node includes greater than a threshold number of active direct wireless links to other nodes, the potential node may be avoided.

Figure 8B:
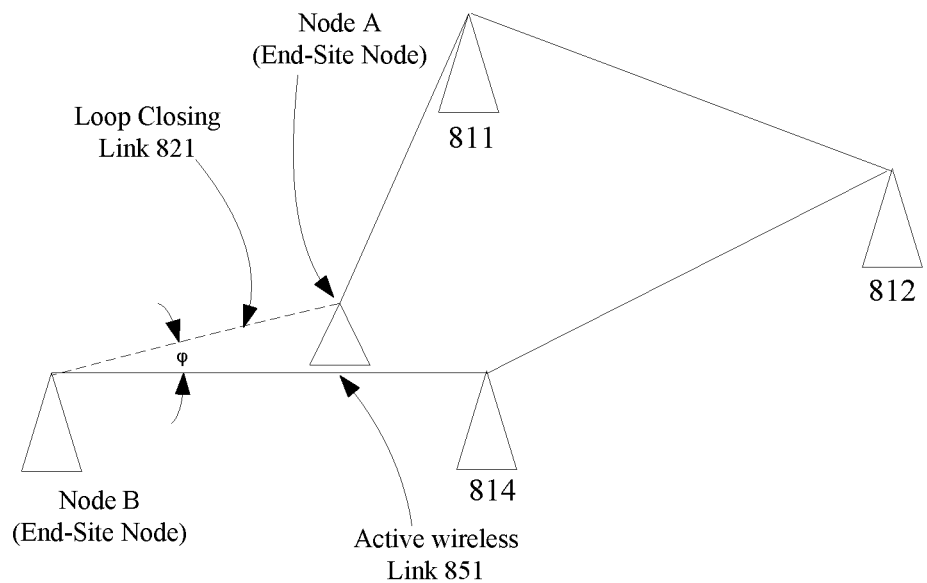

For an embodiment, the link quality is determined by an angle between the wireless link between each end-site node and the one or more potential nodes, and existing active wireless links of the one or more potential nodes. For an embodiment, as shown in FIG. 8B, when the angle between an end-site node and active wireless links of the one or more potential nodes is below a threshold, the potential node may be avoided.

For an embodiment, providing the wireless link connection between one or more of the end-site nodes and the closing node includes scheduling wireless communication between the one or more end-site nodes and the closing node, wherein each of the one or more end-site nodes and the closing node receive the schedule. That is, the schedule provides each node with timing of when communication between the nodes is to be completed.

For an embodiment, providing the wireless link connection between one or more of the end-site nodes and the closing node comprising scheduling beamforming directions of multiple antennas of the one or more end-site nodes or the closing node to be directed to the other of the one or more end-site nodes and the closing node.

Figure 6:
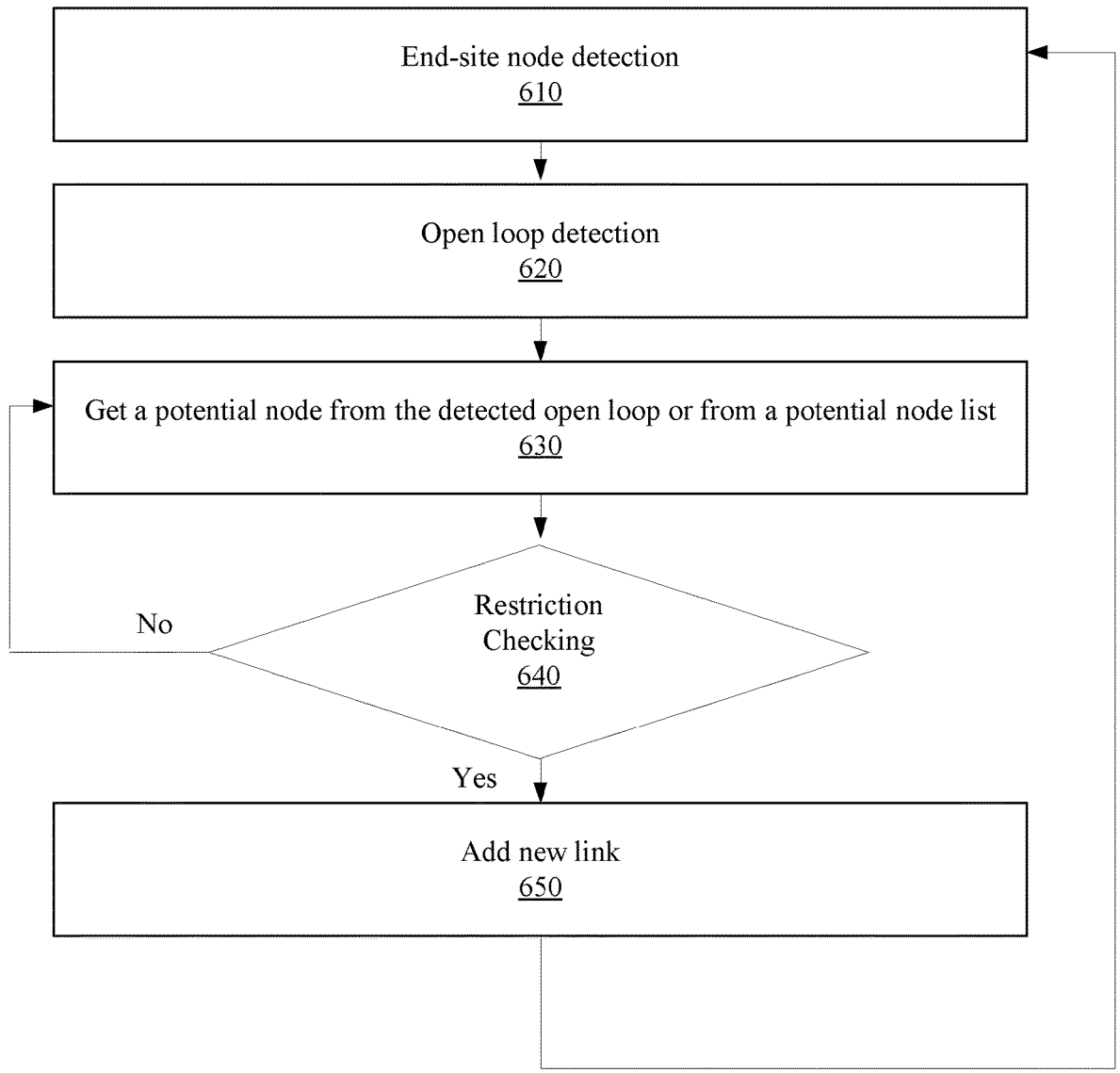
FIG. 6 is a flow chart that includes steps of a method of adding a wireless link to an end-site node of a wireless mesh network, according to an embodiment.

FIG. 6 is a flow chart that includes steps of a method of adding a wireless link to an end-site node of a wireless mesh network, according to an embodiment. A first step 610 includes detecting end-site nodes. As previously described, for an embodiment, end-site nodes are identified as having only a single wireless link connection to other nodes of the wireless mesh network. A second step 620 includes detection of open loops of the wireless mesh network. As previously described, for an embodiment, open loops are detected by identifying end-site nodes that have a direct line-of-sight (LOS) with each other, or that have a wireless link between the end-site nodes is better than a preselected quality threshold. The end-site nodes are the end nodes of the detected open loops. For an embodiment, the other end-site node is the end-site node having the fewest wireless hops between the end-site node. As previously stated, closing open loops includes adding only a single wireless link for closing each open loop, which provides a redundant wireless link of the two end-site nodes of the open loop with a single wireless link. For this reason, closing of open loops of preferred over merely adding a second wireless link to a non-end site node.

A third step 630 include getting a potential node (also referred to a closing node) the detected open loops for from a potential node list (which includes, for example, proximate non-end-site node having a possible wireless link with the end-site node of better than a quality threshold).

A fourth step 640 includes restriction checking. This can include determining whether adding a wireless link to close an open loop cannot be completed due to the wireless link being below a desired quality threshold or some other closing loop restriction. For an embodiment, adding a wireless link between the end-site node and a potential node to close an open loop is restricted because the potential node may already have a number of direct wireless links to more than a threshold number of adjacent or neighboring nodes. FIG. 8A shows examples of a potential node having several direct wireless links to adjacent or neighboring nodes. For an embodiment, adding a wireless link between the end-site node and a potential node to close an open loop is restricted when the added wireless link has a connecting link angle that is less than a threshold different than an existing active wireless link of the wireless mesh network. FIG. 8B shows and example of an added wireless link has a connecting link angle that is less than a threshold different than an existing active wireless link of the wireless mesh network. For an embodiment, as previously described, adding a wireless link between the end-site node and a potential node to close an open loop is restricted when the added wireless link causes or would cause interference with other active wireless links of the wireless mesh network greater than a selected threshold. Further, for an embodiment, adding a wireless link between the end-site node and a potential node to close an open loop is restricted when formation of the added wireless link is not possible. For example, there may be a node mismatch in which the end-site node and the potential connecting node have incompatible node configurations. For example, the end-site node and the potential connecting node may have incompatible wireless channels or incompatible security criteria. Further, an added wireless link may be restricted due to an interfering condition, such as, a building that blocks a line-of-sight wireless connection.

A fifth step 650 includes adding a new link between end-site nodes of the open loop, or between the end-site node and a non-end-site node. The previously described criteria can be used for determining whether to add the new wireless link to close an open loop or not. As described, it is preferable to close the open loop.

The process is then repeated until all the end-site nodes have been provided with an alternate or secondary wireless link for connecting to the wireless mesh network.

As previously described, for an embodiment, adding a wireless link includes scheduling wireless communication between the nodes the link is being added. With the schedule, each node can support the wireless link. Further, for an embodiment, wireless beams are formed through beamforming patterns that are selected over time based upon schedule wireless communication enabling the establishment of the wireless links.

For an embodiment, the utilization of the multiple links (the existing link and the added new link) include time multiplexing wireless communication between the wireless links. Further, the use may be demand-based. Further, the use of the links may be time multiplexed in coordination with other nodes to optimize throughput through the entire network, and to reduce interference within the wireless mesh network.

Figure 7:
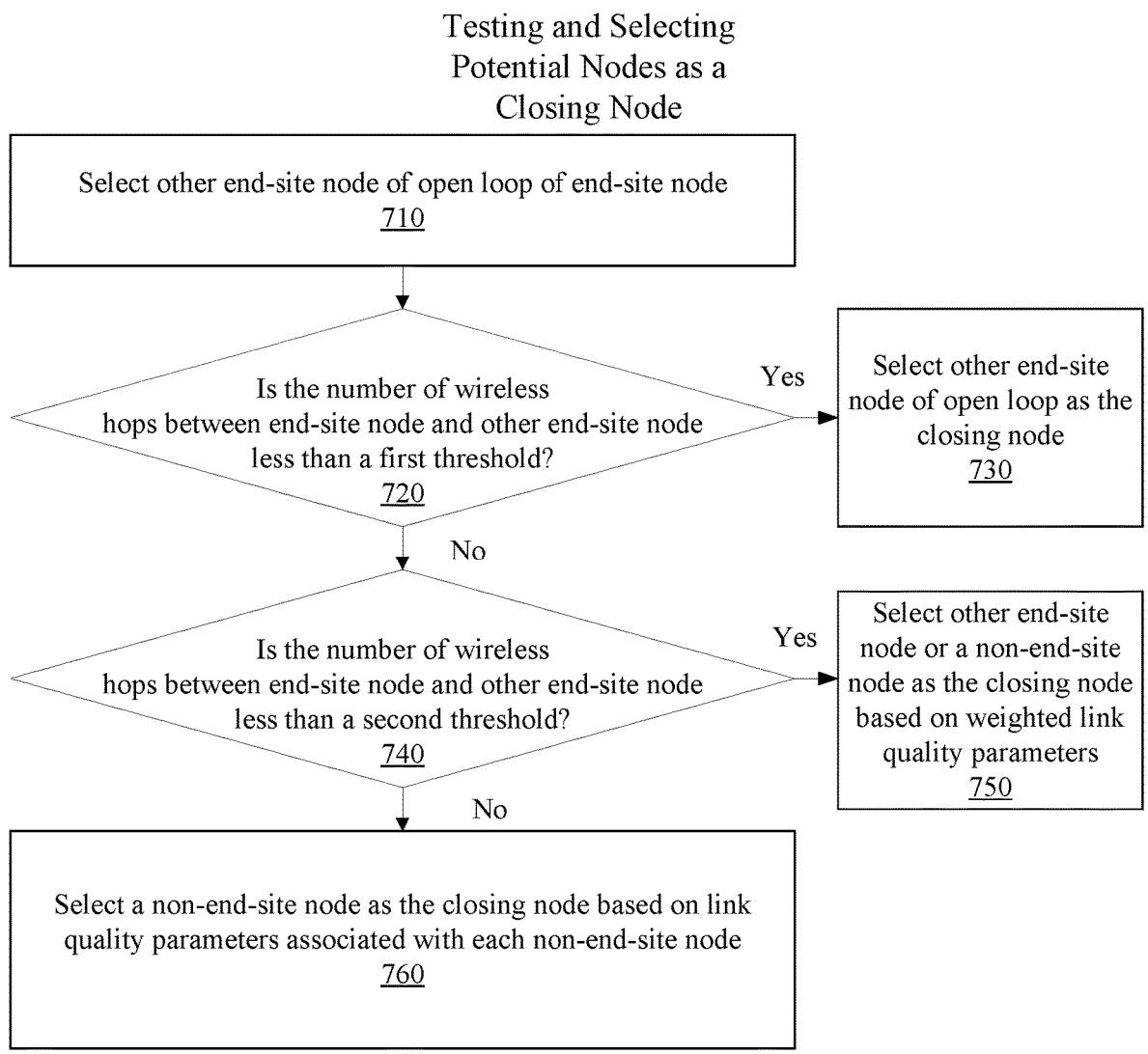
FIG. 7 is a flow chart that includes steps of a method of selecting a closing node for adding a wireless link between an end-site node and the closing node of a wireless mesh network, according to an embodiment.

FIG. 7 is a flow chart that includes steps of a method of selecting a closing node for adding a wireless link between an end-site node and the closing node of a wireless mesh network, according to an embodiment. A first step 710 includes selecting the other end-site node of an identified open loop as the candidate closing node. A second step 720 includes selecting the other end-site node of the identified open loop as the candidate closing node if the number of wireless hops of the open loop is less than a first preselected threshold. If the number of wireless hops is less than the first threshold, then a third step 730 include selecting the other end-site node and adding a wireless link between the end-site nodes to close the open loop.

However, if the number of wireless hops of the open loop is greater than the first threshold, then other factors may be used in selecting the closing node. A fourth step 740 include determining whether the number of wireless hops of the open loop is greater than the first threshold but less than a second threshold. If less than the second threshold, a fifth step 750 includes selecting the other end-site node or a non-end site node based on the link quality between the other end-site node or a non-end site node. For an embodiment, the link quality is determined based on one or more of a signal power between the end-site node and the other node, a signal to noise parameter between the end-site node and the other node, a throughput between the end-site node and the other node, a throughput between the end-site node and an upstream (multiple wireless hops) throughput between the end-site node and a wire connection node (such as, a POP), or an level of interference caused by the addition of a link between the end-site node and the other node. Based on any combination of the stated candidate selection parameters, a candidate node is selected, and a new link added between the end-site node and the candidate node.

If the number of wireless hops of the open loop is greater than the second threshold, then the other end-site node is not selected as the candidate node, and other non-end-site node are evaluated to determine the proper candidate node for adding the new wireless link.

FIGS. 8A and 8B show examples of conditions of a potential connecting node that may negate (restrict) closing an open loop using the potential connecting node, according to embodiments. FIG. 8A shows a potential connecting node (Node B) that is operating with 4 active links (1, 2, 3, 4). Adding the loop closing link 811 to the connecting node (Node B) increases the number of direct wireless links to adjacent or neighboring nodes to 5 active links. For an embodiment, the number of active direct wireless links to adjacent or neighboring nodes is limited to a threshold number. If adding the loop closing link 811 causes the number of active direct wireless links to adjacent or neighboring nodes of the potential connecting node to exceed the threshold number, then the loop closing link 811 is avoided, and another potential node must be selected to wirelessly connect with the end-site node.

FIG. 8B shows a potential connecting node (Node B) in which a loop closing link 821 has an angle $\varphi$ between an existing active link 851 and the loop closing link 821. For an embodiment, the loop closing link 821 is avoided if the angle $\varphi$ is less than a predetermined threshold. The size of the angle $\varphi$ can provide an indication of possible interference between the loop closing link 821 and the existing active link 851. Accordingly, an embodiment includes avoiding the loop closing link 821 when the angle $\varphi$ between an existing active link 851 and the loop closing link 821 is less than a preselected threshold.

Although specific embodiments have been described and illustrated, the embodiments are not to be limited to the specific forms or arrangements of parts so described and illustrated. The described embodiments are to only be limited by the claims.

What is claimed:
1. A method, comprising:
    determining a representation of a wireless mesh network including nodes, and wireless links between the nodes;
    identifying end-site nodes of the wireless mesh network, wherein the end-site nodes have only a single wireless link to the wireless mesh network;
    determining open loops of the wireless mesh network that include the identified end-site nodes;
    generating a list of potential nodes for closing of the open loops with the identified end-site nodes;
    testing one or more of the potential nodes, comprising testing performance of a wireless connection between the end-site nodes and the one or more potential nodes, wherein the performance includes a number of wireless hops around the closing of the open loops formed including the end-site nodes and the one or more potential nodes;
    selecting a closing node based on the testing; and
    providing a wireless link connection between one or more of the end-site nodes and the closing node.
2. The method of claim 1, wherein the generated list of potential nodes includes identified end-site nodes and non-end-site nodes.
3. The method of claim 2, wherein selecting the closing node based on the testing include preferentially weighting identified end-site nodes as the closing node over the non-end-site nodes as the closing node.
4. The method of claim 3, wherein a non-end-site node is selected as the closing node when the number of wireless hops around a closed loop formed including the end-site nodes is greater than a preselected number.

5. The method of claim 1, wherein the testing of the one or more potential nodes further includes determining a link quality of a wireless link between the end-site nodes and the one or more potential nodes.

6. The method of claim 5, wherein the link quality is determined by a resulting signal strength between the end-site nodes and the one or more potential nodes.

7. The method of claim 5, wherein the link quality is determined by a resulting throughput between the end-site nodes and the one or more potential nodes.

8. The method of claim 5, wherein the link quality is determined by a resulting throughput between the end-site nodes and an upstream point of presence (POP) resulting from the wireless link between the end-site nodes and the one or more potential nodes, wherein the POP includes a wired connection to an upstream network.

9. The method of claim 5, wherein the link quality is determined by a resulting interference with other wireless links of the mesh network caused by the wireless link between the end-site nodes and the one or more potential nodes.

10. The method of claim 5, wherein the link quality is determined by a number or existing active links between neighboring nodes of the one or more potential nodes.

11. The method of claim 5, wherein the link quality is determined by an angle between the wireless link between the end-site nodes and the one or more potential nodes, and existing active wireless links of the one or more potential nodes.

12. The method of claim 1, wherein providing the wireless link connection between the one or more of the end-site nodes and the closing node comprising scheduling wireless communication between the one or more of the end-site nodes and the closing node, wherein the one or more of the end-site nodes and the closing node receive the scheduling.

13. The method of claim 1, wherein providing the wireless link connection between one or more of the end-site nodes and the closing node comprising scheduling beamforming directions of multiple antennas of the one or more of the end-site nodes or the closing node to be directed to an other of the one or more of the end-site nodes and the closing node.

14. A system, comprising:
a plurality of wireless nodes, wherein wireless links between the plurality of wireless nodes form a wireless mesh network;
a network server, the network server operating to:
determine a representation of the wireless mesh network including nodes, and wireless links between the nodes;
identify end-site nodes of the wireless mesh network, wherein the end-site nodes have only a single wireless link to the wireless mesh network;
determine open loops of the wireless mesh network that include the identified end-site nodes;
generate a list of potential nodes for closing of the open loops with the identified end-site nodes;
test one or more of the potential nodes, comprising testing performance of a wireless connection between the end-site nodes and the one or more potential nodes, wherein the performance includes a number of wireless hops around the closing of the open loops formed including the end-site nodes and the potential nodes;
select a closing node based on the test; and
provide a wireless link connection between one or more of the end-site nodes and the closing node.

15. The system of claim 14, wherein the generated list of potential nodes includes identified end-site nodes and non-end-site nodes.

16. The system of claim 15, wherein select the closing node based on the testing includes preferentially weighting identified end-site nodes as the closing node over non-end-site nodes as the closing node.

17. The system of claim 16, wherein a non-end-site node is selected as the closing node when the number of wireless hops around a closed loop formed including the end-site nodes is greater than a preselected number.

18. The system of claim 14, wherein the testing of the one or more potential nodes further includes determining a link quality of a wireless link between the end-site nodes and the one or more potential nodes.

19. The system of claim 18, wherein the link quality is determined by a resulting signal strength between the end-site nodes and the one or more potential nodes.

20. The system of claim 18, wherein the link quality is determined by a resulting throughput between the end-site nodes and the one or more potential nodes.

* * * * *